United States Patent
Harrington et al.

(10) Patent No.: US 7,650,530 B2
(45) Date of Patent: Jan. 19, 2010

(54) INITIALIZING A PROCESSING SYSTEM TO ENSURE FAIL-SAFE BOOT WHEN FAULTY PCI ADAPTERS ARE PRESENT

(75) Inventors: Bradley Ryan Harrington, Austin, TX (US); David Lee Randall, Leander, TX (US); Scott Douglas Walton, Pflugerville, TX (US); David Ross Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1599 days.

(21) Appl. No.: 10/262,055

(22) Filed: Sep. 30, 2002

(65) Prior Publication Data

US 2004/0064761 A1 Apr. 1, 2004

(51) Int. Cl.
*G06F 11/00* (2006.01)
(52) U.S. Cl. ............................ 714/5; 714/34; 714/36
(58) Field of Classification Search ............ 714/5, 714/34, 36, 43; 710/312, 313
See application file for complete search history.

(56) References Cited

U.S. PATENT DOCUMENTS

| | | | |
|---|---|---|---|
| 5,692,219 A * | 11/1997 | Chan et al. ............... 710/49 |
| 5,815,647 A * | 9/1998 | Buckland et al. ............ 714/3 |
| 5,915,103 A * | 6/1999 | Chambers et al. ......... 710/313 |
| 6,061,754 A * | 5/2000 | Cepulis et al. ............. 710/312 |
| 6,223,299 B1 | 4/2001 | Bossen et al. |
| 6,272,626 B1 * | 8/2001 | Cobbett ..................... 713/2 |
| 6,393,586 B1 * | 5/2002 | Sloan et al. ............... 714/25 |
| 6,557,121 B1 * | 4/2003 | McLaughlin et al. ........ 714/44 |
| 6,904,546 B2 * | 6/2005 | Wu et al. .................. 714/44 |
| 2002/0087919 A1 * | 7/2002 | Bennett .................... 714/43 |
| 2002/0095624 A1 * | 7/2002 | Cabezas et al. ............. 714/43 |
| 2002/0124194 A1 * | 9/2002 | Dawkins et al. ........... 713/310 |

* cited by examiner

*Primary Examiner*—Joshua A Lohn
(74) *Attorney, Agent, or Firm*—Diana Roberts Gerhardt; Mark P Kahler

(57) ABSTRACT

EEH methods are used during the boot process to actively disable a defective PCI adapter, thereby allowing the system boot to continue without disruption. This allows faulty adapters to be present in the machine without interrupting the boot process. The slots appear to be empty and the devices/adapters residing therein can be actively "hot swapped" out without altering the rest of the machine state.

14 Claims, 3 Drawing Sheets

INITIALIZING A PROCESSING SYSTEM TO ENSURE FAIL-SAFE BOOT WHEN FAULTY PCI ADAPTERS ARE PRESENT

BACKGROUND OF THE INVENTION

1. Field of the Invention

The present invention relates in general to bus error handling and in particular to handling bus errors during the boot process of a symmetric multiprocessor (SMP) system. Still more particularly, the present invention relates to handling of bus errors during the boot process without needing to correct the error before proceeding with the boot process.

2. Description of the Related Art

Since the early 1980's, the personal computer industry has grown by leaps and bounds. Improving the operational speed of computer systems is demanded by consumers and is the driving force behind the rapid development and evolution of computer systems. Initially, research and development focused on increasing the speed of the single processor used by early systems; more recently, substantial effort has gone into the utilization of multiple processors in a computer system to perform parallel processing, thereby increasing the speed of operations even further.

The use of multiprocessor systems clearly has increased the operational speed obtainable in computer systems, but the complexity they introduce has also created problems. Servers in particular may have hundreds of I/O devices (e.g., ISA devices such as keyboards, pointing devices, etc., and PCI devices, such as hard drives, ethernet cards, etc.) PCI devices typically make up the majority of I/O devices in the system, and they reside in PCI slots. In addition, due to their often small size and ease of interchangeability, PCI devices are prone to damage and/or improper slot insertion, thereby rendering them non-functional or causing them to function improperly.

The PCI devices may be operating at any time, from start-up to shut-down of the server or other system in which they are installed. They may not be operating at all times, but when they are called upon for use, they must be functioning or the effectiveness of the system will be compromised. Conventionally, the PCI devices communicate via PCI adapters (also referred to as "I/O adapters" or "IOAs"). Multiple PCI adapters connect to a PCI host bridge via a PCI bus. Numerous load and store operations are communicated along the PCI bus, and errors that occur during the load and store operations need to be corrected for proper operation of the system.

To enhance the system recoverability from errors that occur during load and store operations when the system is performing its normal functions (e.g., after the system has completed its boot up process and is performing its intended functions), enhanced error handling (EEH) was developed by IBM (International Business Machines, Armonk, N.Y.). See U.S. Pat. No. 6,223,299 to Bossen et. al, incorporated fully herein by reference. EEH resides in the PCI bridge chip(s) located within the server. Firmware provides a software interface to this hardware function. The EEH program continually monitors the PCI devices connected to the PCI bridge on which it resides during its normal operation and, if an error is detected during a load and store operation, it isolates the PCI slot in which the faulty PCI device is mounted and makes it appear to the rest of the system that the PCI slot is vacant. This assures that any attempts to perform load and store operations will not be directed to faulty PCI devices.

With the increase in system size and complexity, the time required to boot systems has also increased. Since these computer systems have become critical for business operation, their reliability and availability are increasingly more important. For system boot (a.k.a. "cold boot") it is therefore essential that all the components of the system are thoroughly tested to ensure their proper operation before loading/executing business applications. Accordingly, during a system boot, processes are performed that identify and initialize/configure each PCI adapter to assure proper operation. This added need to extensively test a computer system during the boot process adversely impacts boot time and makes it increasingly more important to limit the number of boot operations that need to be performed.

When booting up a prior art computer system, a single faulty PCI adapter will cause the issuance of an error detect indication that will prevent the entire machine from proceeding further in the boot process. When a faulty PCI adapter prevents the booting of the machine, it must be determined which PCI adapter is defective before continuing. Since often these systems have several hundred PCI adapters installed, determining which one is faulty can be a significantly difficult task; the error log must be examined and a determination must be made as to which of the many PCI adapters is the cause of the failure. Once identified, the system must be powered down, the faulty PCI adapters removed and/or replaced, and then an attempt made to boot the machine again.

This continual ceasing/checking/rebooting operation when a faulty PCI adapter exists can cause great delays and significant inconvenience. Accordingly, it would be desirable to have a method by which faulty PCI adapters could be detected without preventing the booting of the machine.

SUMMARY OF THE INVENTION

In accordance with the present invention, EEH methods are used during the boot process to actively disable a defective PCI adapter, thereby allowing the system boot to continue without disruption. This allows faulty adapters to be present in the machine without interrupting the boot process. The slots appear to be empty and the devices/adapters residing therein can be actively "hot swapped" out without altering the rest of the machine state.

DETAILED DESCRIPTION OF THE PREFERRED EMBODIMENTS

Figure 1:
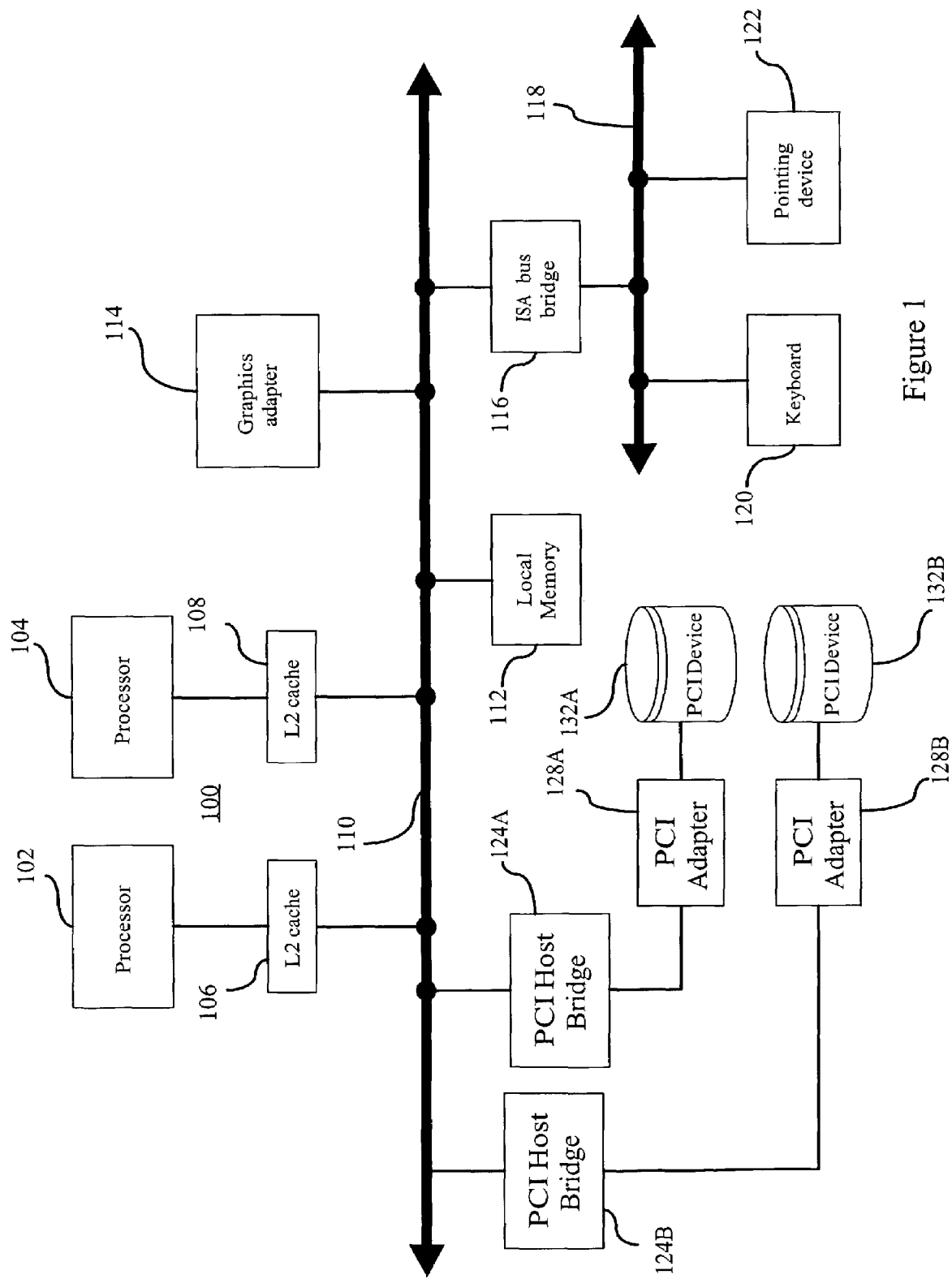
FIG. 1 is a block diagram of a typical data processing system in which a preferred embodiment of the present invention may be implemented.

With reference now to the figures, and in particular with reference to FIG. 1, a typical data processing system in which a preferred embodiment of the present invention is implemented is depicted. Data processing system 100 is a symmetric multiprocessor (SMP) system including a plurality of processors 102 and 104, which can comprise, for example, one of the PowerPC™ family of processors available from IBM. Although only two processors are depicted in the exemplary system, a single processor or many additional processors may be utilized. The invention is applicable to other systems besides SMP data processing systems, such as uniprocessor systems, NUMA architecture systems, cluster systems, and the like.

In the exemplary system of FIG. 1, each processor 102 and 104 has an associated level two (L2) cache 106 and 108, respectively, for staging data and instructions to the processors. Processors 102 and 104 are connected, through L2 caches 106 and 108, to system bus 110. Also connected to system bus 110 is local memory 112, a memory mapped graphics adapter 114 providing a connection for a display (not shown), and an ISA bus bridge coupling system bus 110 to ISA bus 118. ISA devices such as keyboard 120 and a pointing device 122, which may be a mouse, trackball, or the like, are connected to ISA bus 118.

In accordance with the present invention, connected to system bus 110 is a first PCI host bridge 124A and a second PCI host bridge 124B. PCI host bridge 124A couples system bus 110 to a PCI adapter 128A, which in turn is connected to a PCI device such as nonvolatile storage device 132A. PCI host bridge 124B couples system bus 110 to a PCI adapter 128B, which in turn is connected to a PCI device such as nonvolatile storage device 132B.

Nonvolatile storage devices 132A and 132B may be magnetic disk drives, solid state disks, or other conventional storage devices, and it is understood that while two such devices are shown for illustrative purposes, a system may have only one or (as is typical) many more than two such devices. In accordance with the present invention, each PCI device in the system has its own PCI bridge and PCI adapter, i.e., there is a one-to-one correlation between PCI adapters and PCI bridges, and each PCI adapter is thus isolated with a discrete PCI bridge. Since there is a separate PCI bridge for each PCI device, this also means that there is a separate EEH program associated with each PCI device. As described below, this enables discrete testing of each PCI device during boot-up. Although the embodiment illustrated in FIG. 1 implements a PCI bridge for each PCI adapter, the isolation may also be implemented by other means, for example, using PCI to PCI bridges between the PCI bridge and the PCI adapter.

The general operation of data processing system 100 will be apparent to those in the art. Software contained within storage devices, such as nonvolatile storage devices 132 and 134 or other devices such as a read-only memory (ROM), includes an operating system and related routines which are loaded in response to the system being powered on. Such software is loaded into system memory 112 and staged via L2 caches 106 and 108 to processors 102 and 104, as is application software and related data also contained within storage devices 132 and/or 134. Keyboard 120 and pointing device 122 may be employed to control the software applications being executed through a user interface, which maybe a graphical user interface.

Boot firmware and runtime firmware is also stored in the data processing system. Boot firmware is a set of software algorithms that perform various tests and initial setup of hardware components prior to the loading on of control transfer to an operating system. Runtime firmware is a set of algorithms that provide an operating system interface to various hardware components, masking differences between similar components on different hardware platforms.

Those skilled in the art will recognize that data processing system 100 may include many additional components not explicitly shown in FIG. 1, such as serial and parallel ports, connections to networks or attached devices, a controller regulating access to system bus 110 and/or system memory 112, etc. In addition, other system architecture structures, such as NUMA or cluster structures, may be employed in conjunction with the present invention. Such modifications and variations are within the spirit and scope of the present invention.

Figure 2A:
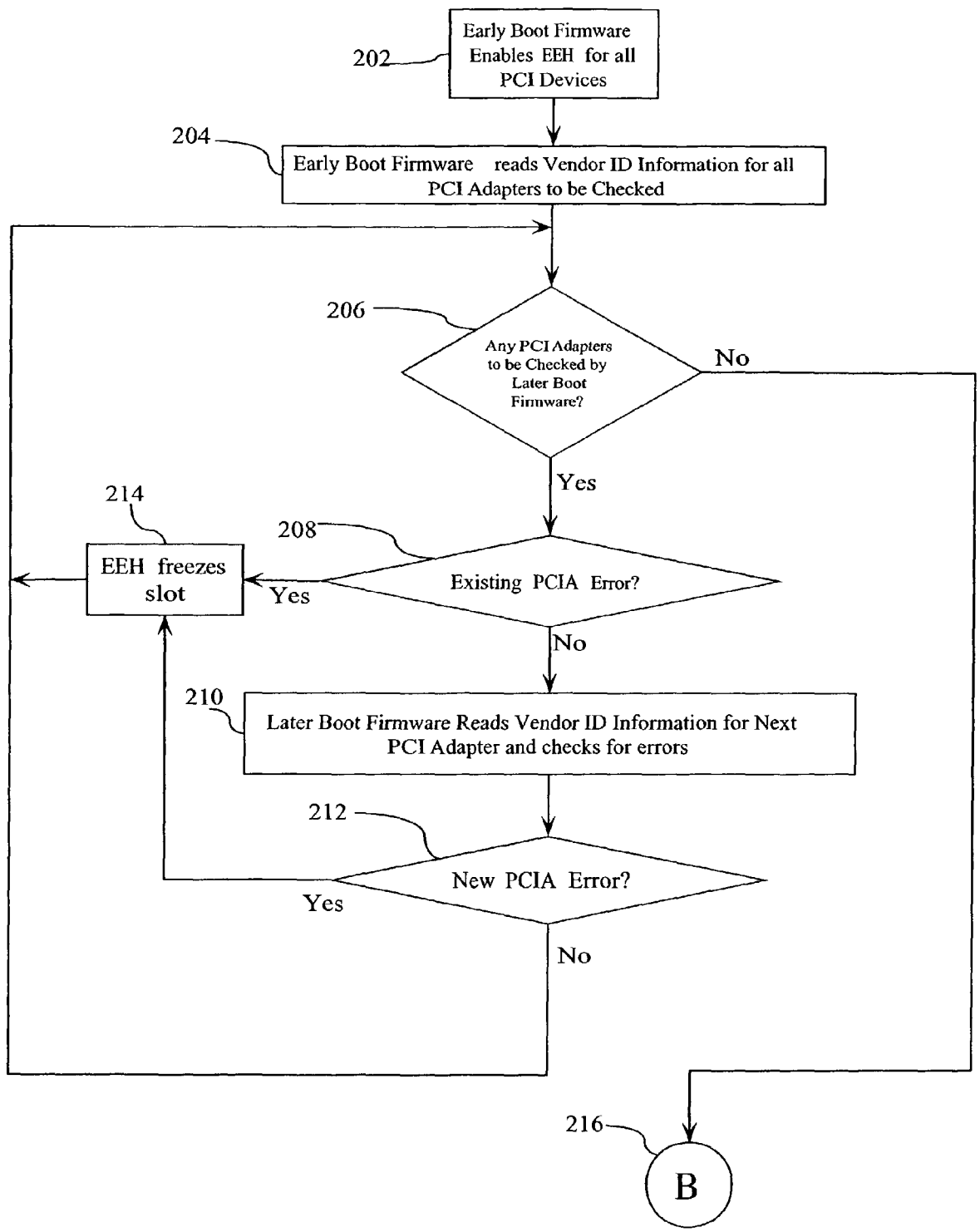
FIGS. 2A and 2B are a flowchart illustrating the steps to be performed in accordance with the present invention.
Figure 2B:
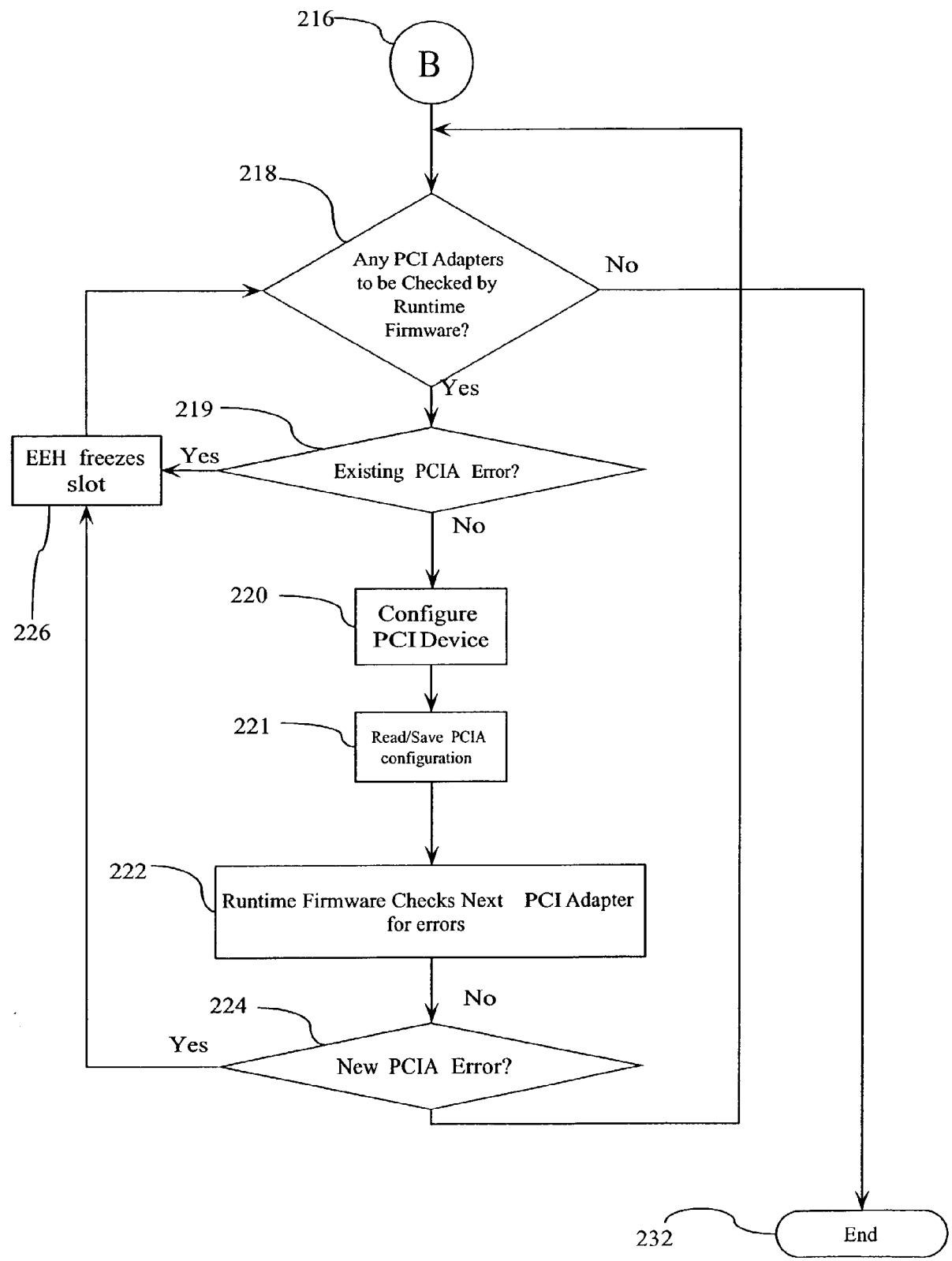

FIGS. 2A and 2B are a flowchart illustrating an example of the steps performed by the boot firmware of the processing system in accordance with the present invention to achieve the above-described desired result, that is, to utilize EEH during the boot process to actively disable defective PCI adapters, thereby allowing the system boot to continue without disruption.

Referring to FIG. 2A, at step 202, when the boot process begins, the EEH protective capability is enabled to activate the error protection capability. EEH is controlled by the PCI bridge (e.g., via hardware logic or hardware configured using software). This enabling function is performed for all PCI devices in the system at step 202, although it is understood that they could be enabled on an "as you go" basis.

At step 204, the boot firmware reads the vendor ID information of the first PCI device. For example, each PCI bus has a number, and the boot firmware begins with the lowest-numbered bus and works its way upward. At step 206, a determination is made as to whether there are any PCI adapters to be checked later in the boot process. If there are none to be checked, the process proceeds to step 216. If there are PCI adapters to be checked later in the boot process, then at step 208, the boot firmware checks the PCI adapter for an existing PCI adapter error ("PCIA error"). If at step 206, it is determined that a PCIA error already exists, at step 214 the EEH "freezes" the slot (i.e., the slot is disabled and appears to the system as though it were empty).

If at step 208, it is determined that no existing PCIA error has been identified, at step 210, the boot firmware reads the vendor ID information and, at step 212, checks the device for errors using its EEH capabilities. If, at step 212, a previously-undetected PCIA error is encountered by the boot firmware, then at step 214 the EEH freezes the slot as discussed above. If at step 212, a determination is made that no PCIA error is detected by the boot firmware, the process returns to step 206 and continues until all PCI adapters have been checked by the boot firmware.

Once all PCI adapters have been checked for errors by the boot firmware, at step 218 (FIG. 2B), a determination is made as to whether there are any PCI adapters to be checked by the runtime firmware. If there are no additional PCI adapters to be checked by the runtime code, the process completes at step 232, and the boot process continues. If, however, at step 218, a determination is made that there are additional PCI adapters to be checked by the runtime code, then, at step 220, a determination is made as to whether or not there are any existing PCIA errors for the PCI adapter being checked. At step 220, if an error condition has already been identified by the boot firmware in the device in the slot being checked, the process proceeds to step 226 where the slot associated with the device having the error is frozen, as discussed above. The process then returns to step 218 to see if there are anymore PCI adapters to be checked.

If, at step 219, an existing error in the device in the slot being checked is not found, at step 220 the PCI device is configured. At step 221, the PCI configuration data is read and saved, and at step 222 a final check is made for PCIA errors. If, at step 222, a PCIA error is detected by the runtime code, then at step 226, the EEH freezes the slot (as described above) and the process returns to step 218 to determine if there are any more PCI adapters to be checked. Likewise, if at step 224, no PCIA errors are detected by the run-time code, this is an indication that the device in the slot being checked is operating correctly and the process completes at step 232 and the boot process continues in the conventional manner.

By using EEH methods during the boot process, faulty devices are identified and functionally "removed" from the system "on the fly", thereby prohibiting the boot process from being stopped because of the faulty device. The system can proceed through boot-up and have the OS run diagnostics on any PCI devices that have been identified as faulty to determine if they can be repaired and/or separately corrected. The result is a much smoother boot process that which keeps critical systems operating. Since the slots containing the faulty devices will appear empty to the system user, the faulty devices can be easily "hot-swapped," without altering the rest of the machine state. This is a significant improvement over the prior art remedy, which required that the machine be powered off before repair/replacement of the faulty device, and then required a complete system reboot after the repair/replacement.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1, 2A and 2B support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of handling bus errors during the boot process of a processing system having plural PCI adapters, each having an associated PCI slot, comprising the steps of:
   responsive to a boot request, enabling enhanced error handling (EEH) for each PCI adapter;
   checking each PCI adapter for errors using EEH;
   responsive to the detection of an error in any of said PCI adapters, freezing the PCI slot for any of said PCI adapters for which errors have been detected; and
   continuing with the boot process after all PCI adapters have been checked for errors.

2. A method as set forth in claim 1, wherein said enabling, checking, freezing, and continuing steps are performed using boot firmware stored on said processing system.

3. A method as set forth in claim 2, wherein said checking step comprises at least the steps of:
   determining if there are any PCI adapters to be checked for errors by said boot firmware;
   for any PCI adapters to be checked for errors by said boot firmware, determining if there are any existing PCI adapter (PCIA) errors that have already been detected;
   if there is an existing PCIA error detected for a particular PCI adapter, immediately freezing the PCI slot associated with said PCI adapter and then checking to see if there are any additional PCI adapters to be checked by said boot firmware;
   if there is not an existing PCIA error detected for a particular PCI adapter, reading vendor ID information for the next PCI adapter to be checked and checking said PCI adapter for new PCIA errors; and
   if there is a new PCIA error detected for a particular PCI adapter, immediately freezing the PCI slot associated with said PCI adapter and then checking to see if there are any additional PCI adapters to be checked by said boot firmware.

4. A method as set forth in claim 3, wherein said boot firmware includes runtime code, and wherein said checking step further comprises at least the steps of:
   determining if there are any PCI adapters to be checked for errors by said runtime code;
   for any PCI adapters to be checked for errors by said runtime code, determining if there are any existing PCI adapter (PCIA) errors that have already been detected;
   if there is an existing PCIA error detected for a particular PCI adapter, immediately freezing the PCI slot associated with said PCI adapter and then checking to see if there are any additional PCI adapters to be checked by said runtime code;
   if there is not an existing PCIA error detected for a particular PCI adapter, reading vendor ID information for the next PCI adapter to be checked and checking said PCI adapter for new PCIA errors; and
   if there is a new PCIA error detected for a particular PCI adapter, immediately freezing the PCI slot associated with said PCI adapter and then checking to see if there are any additional PCI adapters to be checked by said runtime code.

5. A method as set forth in claim 1, further comprising the step of:
   isolating each PCI adapter with a discrete PCI bridge.

6. A computer program product for handling bus errors during the boot process of a processing system having plural PCI adapters, each having an associated PCI slot, the computer program product comprising a computer-readable storage medium having computer-readable program code, the computer-readable program code comprising:
   computer-readable program code that, responsive to a boot request, enables enhanced error handling (EEH) for each PCI adapter;
   computer-readable program code that checks each PCI adapter for errors using EEH;
   computer-readable program code that, responsive to the detection of an error in any of said PCI adapters, freezes the PCI slot for any of said PCI adapters for which errors have been detected; and
   computer-readable program code that continues the boot process after all PCI adapters have been checked for errors.

7. A computer program product as set forth in claim 6, wherein said computer-readable code for enabling, checking, freezing, and continuing comprises boot firmware stored on said processing system.

8. A computer program product as set forth in claim 7, wherein said computer-readable code for checking each PCI adapter using EEH comprises:
   computer-readable code that determines if there are any PCI adapters to be checked for errors by said boot firmware;
   computer-readable code that, for any PCI adapters to be checked for errors by said boot firmware, determines if there are any existing PCI adapter (PCIA) errors that have already been detected;
   computer-readable code that, if there is an existing PCIA error detected for a particular PCI adapter, immediately freezes the PCI slot associated with said PCI adapter and then checks to see if there are any additional PCI adapters to be checked by said boot firmware;

computer-readable code that, if there is not an existing PCIA error detected for a particular PCI adapter, reads vendor ID information for the next PCI adapter to be checked and checks said PCI adapter for new PCIA errors; and computer-readable code that, if there is a new PCIA error detected for a particular PCI adapter, immediately freezes the PCI slot associated with said PCI adapter and then checks to see if there are any additional PCI adapters to be checked by said boot firmware.

9. A computer program product as set forth in claim 8, wherein said boot firmware includes runtime code, and wherein said computer-readable code for checking each PCI adapter for errors using EEH further comprises:

computer-readable program code that determines if there are any PCI adapters to be checked for errors by said runtime code;

computer-readable program code that, for any PCI adapters to be checked for errors by said runtime code, determines if there are any existing PCI adapter (PCIA) errors that have already been detected;

computer-readable program code that, if there is an existing PCIA error detected for a particular PCI adapter, immediately freezes the PCI slot associated with said PCI adapter and then checks to see if there are any additional PCI adapters to be checked by said runtime code;

computer-readable program code that, if there is not an existing PCIA error detected for a particular PCI adapter, reads vendor ID information for the next PCI adapter to be checked and checks said PCI adapter for new PCIA errors; and computer-readable program code that, if there is a new PCIA error detected for a particular PCI adapter, immediately freezes the PCI slot associated with said PCI adapter and then checks to see if there are any additional PCI adapters to be checked by said runtime code.

10. A system for handling bus errors during the boot process of a processing system, comprising:

plural PCI adapters, each having an associated PCI slot; and a processor, coupled to said PCI adapters, configured to:
responsive to a boot request, enable enhanced error handling (EEH) for each PCI adapter;
check each PCI adapter for errors using EEH;
responsive to the detection of an error in any of said PCI adapters, freeze the PCI slot for any of said PCI adapters for which errors have been detected; and
continue the boot process after all PCI adapters have been checked for errors.

11. A system as set forth in claim 10, wherein said enabling, checking, freezing, and continuing steps are performed using boot firmware stored on said processing system.

12. A system as set forth in claim 11, wherein said processor is configured to, while checking for errors using EEH:

determine if there are any PCI adapters to be checked for errors by said boot firmware;

for any PCI adapters to be checked for errors by said boot firmware, determine if there are any existing PCI adapter (PCIA) errors that have already been detected;

if there is an existing PCIA error detected for a particular PCI adapter, immediately freeze the PCI slot associated with said PCI adapter and then check to see if there are any additional PCI adapters to be checked by said boot firmware;

if there is not an existing PCIA error detected for a particular PCI adapter, read vendor ID information for the next PCI adapter to be checked and check said PCI adapter for new PCIA errors; and if there is a new PCIA error detected for a particular PCI adapter, immediately freeze the PCI slot associated with said PCI adapter and then check to see if there are any additional PCI adapters to be checked by said boot firmware.

13. A system as set forth in claim 12, wherein said boot firmware includes runtime code, and wherein said processor is further configured to, while checking for error using EEH:

determine if there are any PCI adapters to be checked for errors by said runtime code;

for any PCI adapters to be checked for errors by said runtime code, determine if there are any existing PCI adapter (PCIA) errors that have already been detected;

if there is an existing PCIA error detected for a particular PCI adapter, immediately freeze the PCI slot associated with said PCI adapter and then check to see if there are any additional PCI adapters to be checked by said runtime code;

if there is not an existing PCIA error detected for a particular PCI adapter, read vendor ID information for the next PCI adapter to be checked and check said PCI adapter for new PCIA errors; and if there is a new PCIA error detected for a particular PCI adapter, immediately freeze the PCI slot associated with said PCI adapter and then check to see if there are any additional PCI adapters to be checked by said runtime code.

14. A system as set forth in claim 10, further comprising:

plural PCI bridges, one each associated with each of said PCI adapters.

* * * * *

UNITED STATES PATENT AND TRADEMARK OFFICE
CERTIFICATE OF CORRECTION

PATENT NO. : 7,650,530 B2
APPLICATION NO. : 10/262055
DATED : January 19, 2010
INVENTOR(S) : Harrington et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1927 days.

Signed and Sealed this

Twenty-third Day of November, 2010

David J. Kappos
*Director of the United States Patent and Trademark Office*